Feb. 16, 1932.　　　N. TRBOJEVICH　　　1,845,063
TAP
Filed July 11, 1927　　　2 Sheets-Sheet 1
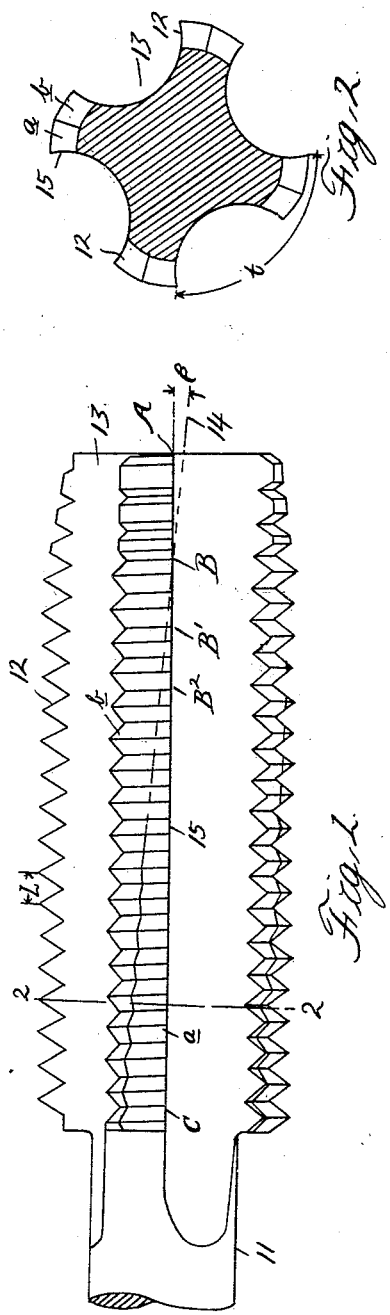
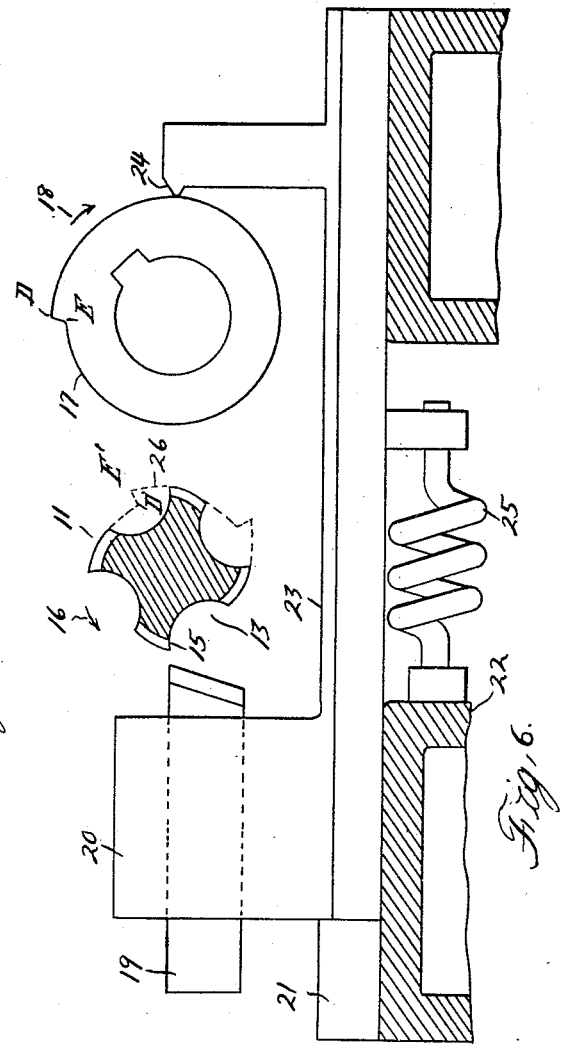
Inventor
Nikola Trbojevich
Attorneys Feb. 16, 1932.　　　N. TRBOJEVICH　　　1,845,063
TAP
Filed July 11, 1927　　2 Sheets-Sheet 2

Inventor
Nikola Trbojevich

By [signature]
Attorneys

Patented Feb. 16, 1932

1,845,063

UNITED STATES PATENT OFFICE

NIKOLA TRBOJEVICH, OF HIGHLAND PARK, MICHIGAN

TAP

Application filed July 11, 1927. Serial No. 204,951.

The invention relates to an improvement in taps such as are used for cutting screw threads in circular holes.

Heretofore taps have been made in two principal forms or types, viz. those having their cutting teeth "backed off" or relieved, and those having unrelieved or cylindrical teeth. Each type possesses certain desirable and also undesirable characteristics. The relieved tap cuts freely and produces a good finish, but it is likely to damage the screw threads when it is withdrawn from the threaded hole and has the further disadvantage that the diameter becomes smaller after each sharpening. The unrelieved tap may be easily withdrawn from the threaded hole and also holds its size after sharpening, but it does not cut as freely and rapidly as a relieved tap and, as a rule, it does not produce as good a finish.

I have conceived the idea of constructing a tap in which all teeth that do the actual cutting will be relieved so that they may cut freely and yet the tap can be withdrawn from the hole without damaging the threads and it also can be resharpened without losing its size. As it will be hereinafter fully explained, the new method of making such taps is rather simple, accurate and economical and may be performed in standard machine tools. The method is also applicable to making of hobs of the tangential feed type such as are used for hobbing of worm gears.

In the drawings;

Figure 1 is a side view of my improved tap in which the unrelieved and the relieved portions of cutting threads are indicated by the letters $a$ and $b$ respectively.

Figure 2 is the cross section in the plane 2—2 of the tap shown in Figure 1.

Figure 6 is a diagrammatical view of a back-off machine with which my method may be carried out.

Figure 3:
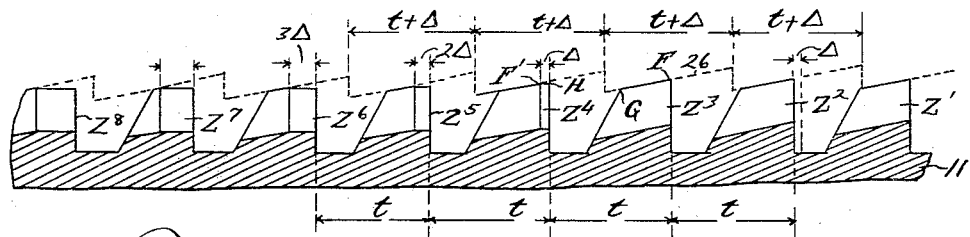
Figures 3, 4 and 5 are diagrams explanatory to the theory of the process.

Referring now to Figures 1 and 2 of the drawings the improved tap 11 has a screw thread formed on the periphery thereof, portions of which are cut away by the longitudinally extending flutes 13 leaving the series of threaded portions 12. Each threaded portion 12 has a series of thread segments or teeth B, B', B² etc. extending circumferentially from the cutting faces 15 formed by one flute to the rear faces formed by the next flute. According to my invention each thread segment or tooth from B to C is relieved or backed off for a portion of its circumferential width, the relieved portions in adjacent teeth being progressivley decreased in width from B to C. As shown in Figure 1 the helix 14 forming an angle $\beta$ with the cutting face 15 divides the threaded portion 12 into two substantially triangular areas $a$ and $b$, the area $b$ representing the relieved portions of the teeth and the area $a$ the unrelieved or cylindrical portions. It will be seen from the drawings that the portion of the thread extending from A to B consists of roughing teeth only, all of which are relieved and all of which gradually increase in thickness or width from A to B. The first finishing tooth is at B and is of a full width and fully relieved, that is it has no cylindrical land. The next finishing tooth B' has a narrow cylindrical land adjacent the cutting edge and the following tooth B² has a land wider than that of B'. Considering the cutting teeth consecutively from B' to C it will be noted that all possess cylindrical lands of an ever increasing width until at the point C they are cylindrical for practically the entire width.

The practical consenquence is this: When the tap is fed into work from A to B the teeth all cut freely because they are relieved. From B to C the teeth do very little cutting because the thread is already of full size at B. After the work has been tapped through, the rotation of the tap is reversed in order to back out. Now, the threads at C will be the leading ones, and being substantially cylindrical, will back out without mutilating the thread, and in backing out will also guide the following roughing teeth from B to A so that they also will back out through the thread without mutilating the same.

In Figure 3 a development of a helical cutting thread of the improved tap is diagrammatically shown. Altogether eight teeth from $Z_1$ to $Z_8$ inclusive are shown for the purpose of a better illustration of the principle although a complete tap thread in reality may contain a hundred or more cutting teeth.

The method of manufacturing the new taps will now be explained. Figure 6 shows diagrammatically the essential parts of a conventional back-off machine. The work 11 rotates in the direction of the arrow 16 with a constant angular velocity $v_1$. The object is to relieve the cutting teeth 15 so that their cutting faces adjacent to the flutes 13 will stand out prominently relative to the rear portions of said teeth. A cam 17 of the Archimedean spiral type is rotated in the direction of the arrow 18 with a uniform velocity $v_2$. The thread tool 19 is firmly held in the post 20 and said post is slidable in the ways 21 of the machine bed 22. The sliding member 23 also contains the cam follower 24, and presses against the cam 17 with a considerable force derived from the coil spring 25, said spring being anchored at its one end to the bed 22 and at its other end to the slide 23.

The conventional process of backing off taps or any other cutters consists of rotating the work 11 and the cam 18 in such a ratio that the cam will make one full turn while the work rotates from one flute 13 to the next. If the work is helical as is always the case with taps, the work 11 is also given a translation along its axis to generate the desired lead of helix. The highest point D of the cam corresponds to the lowest point D' of the Archimedean spiral segment 26 in the work 11 and the lowest point E of the cam corresponds to the highest point E' in the work.

My improvement consists in so changing the ratio of the timing of the respective rotations of the cam and the work that the spacings of the jumps of the cam, $t+\triangle$ in Figure 3 will be slightly longer than the spacings $t$ of the consecutive flutes, although both spacings are strictly uniform during the relieving operation.

The effect may be studied in Figure 3. Suppose that the tap 11 has been chased down to the full size of thread and that the tooth $Z_3$ is the first finishing or full size tooth. The Archimedean spiral 26 in its downward grade strikes the tooth $Z_3$ at the point F and backs it off along the line FG and also along the sides of the thread. The back-off tool will now rise and then again descend until at the point F' of tooth $Z_4$ it will be at the same distance from the axis of the tap as it was at the point F. Thus, a cylindrical land F'H is formed in the front of the tooth $Z_4$. If the spacing of the cam jumps is equal to $t+\triangle$ and that of flutes to $t$, it is seen that the width F'H $=\triangle$. The width of land at the next tooth $Z_5$ is equal to $2\triangle$, at $Z_6$ to $3\triangle$, etc.

It is now necessary to calculate the increments to suit the purposes previously discussed. If there be $n$ threads in the selected length of tap BC, Figure 1 and N flutes, it follows that the total number of cutting teeth is equal to $Nn$. Assume the width of land at the last tooth C to be equal to $e$, then $$\triangle = \frac{e}{Nn} \quad (1)$$

Figure 4:
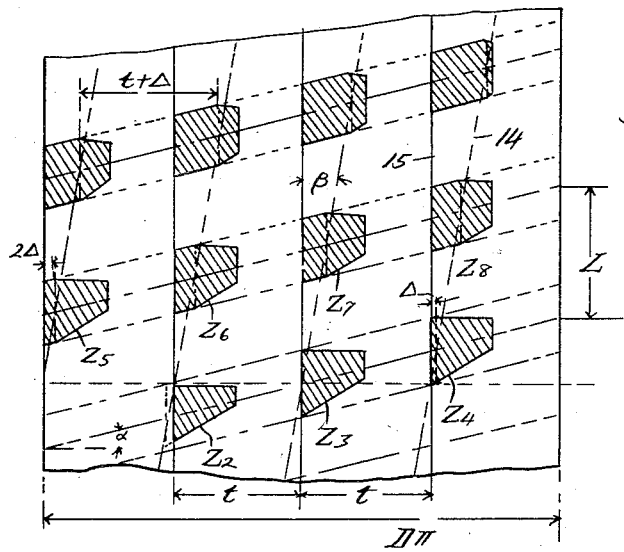

The path of the back-off tool relative to all cutting teeth may be readily followed in Figure 4 which represents the pitch cylinder of the tap as developed in a plane. The abscissa $D\pi$ is the circumference of pitch circle and upon the ordinate are measured off the distances L corresponding to the lead of tap thread. The cutting faces 15 are now a series of parallel vertical lines because they are what is termed straight flutes. If the flutes were helical they would be inclined in development at an angle relative to the axis $D\pi$, but that would not change the principle of this construction which is equally applicable to both straight and helical flutes.

As the back-off tool jumps from $Z_2$ to $Z_3$, $Z_5$, etc. it always keeps on gaining upon the consecutive cutting teeth and so produces the required cylindrical lands of an ever increasing width. The increase is in the manner of an arithmetic series and may be obtained by constant velocity gearing. It is only necessary to gear up the work 11 and the cam 17 Figure 6 in the proper ratio. If a conventional tap were backed off in that machine the ratio of the cam velocity $v_1$ to that of the work velocity $v_2$ would be four because the tap has four straight flutes. In my system the ratio would be $$\frac{4t}{t+\triangle},$$

i. e. slightly less than four to produce the required increment $\triangle$.

Figure 5:
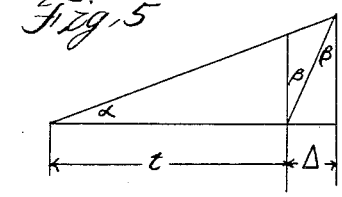

Figure 5 shows the geometrical relationship of the quantities involved $t$, $\alpha$, $\beta$, and $\triangle$. The diagram is derived from the development shown in Figure 4 and will be readily understood.

To back off work that has helical flutes according to this system it is necessary to calculate the change gears controlling the rotation of the back-off cam to produce the helix 14 Figure 4 i. e. the locus of the beginning points of the relieved tooth portions, and not the helix 15 forming the cutting edges as according to standard practice.

When the tap 11, Figure 1 is hardened it may be ground cylindrically in the portion $a$ of the threads. It is seen that this kind of tap grinding is very economical because first it is cylindrical and second it is necessary to grind only a small portion of the screw thread.

When a tap of this kind gets dull, its sharpness is restored by grinding over the faces 15, Figure 1. By inspecting said figure it is seen that by removing a film of metal parallel to the plane 15, an equal amount is subtracted from the width of each cyindrical land, but that otherwise the conditions do not change in the least, i. e. the tap will hold its form and size after sharpening, and the lands will be progressively broadening in the same manner as before the sharpening.

What I claim as my invention is:

1. A thread cutting tool having a threaded portion interrupted by longitudinally extending flutes forming cutting teeth, the teeth at the entrance end of the tool being relieved for the entire circumferential length thereof and the successive teeth toward the rear end of the tool having progressively increasing circumferential length of the full thread diameter.

2. A tap in which the cutting teeth are of the full thread diameter for progressively increasing circumferential lengths from the entrance end of the tap to the opposite end thereof, the remaining portions of said cutting teeth being relieved.

3. A tap comprising a threaded portion interrupted by longitudinally extending flutes forming cutting teeth, the teeth having a portion of their circumferential lengths of the full diameter and a portion relieved to a lesser diameter, the successive teeth from the rear end of the tap toward the entrance end thereof being relieved for progressively increasing circumferential distances.

4. In a thread cutting tap a plurality of cutting teeth helically aligned and provided with cylindrical lands of progressive widths and adjacent to the cutting edges, the width of said lands increasing in an arithmetical series from the entering towards the rear end of said tap.

5. In a thread cutting tap a plurality of helically aligned cutting teeth, each tooth consisting of a relieved and an unrelieved portion so arranged that the widths of the relieved portions diminish, and the widths of the unrelieved portions increase, from the entering toward the rear end of said tap.

In testimony whereof I affix my signature.

NIKOLA TRBOJEVICH.